United States Patent
Ruan et al.

(10) Patent No.: US 6,693,412 B2
(45) Date of Patent: Feb. 17, 2004

(54) POWER SAVINGS IN A VOLTAGE SUPPLY CONTROLLED ACCORDING TO A WORK CAPABILITY OPERATING MODE OF AN INTEGRATED CIRCUIT

(75) Inventors: Helen H. Ruan, San Jose, CA (US); Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/179,638

(22) Filed: Jun. 24, 2002

(65) Prior Publication Data

US 2003/0234636 A1 Dec. 25, 2003

(51) Int. Cl.[7] .................................................. G05F 1/56
(52) U.S. Cl. ................... 323/282; 323/225; 323/271; 323/350; 323/351
(58) Field of Search ............................... 323/225, 271, 323/282, 283, 350, 351

(56) References Cited

U.S. PATENT DOCUMENTS

| | | | |
|---|---|---|---|
| 5,744,944 A | * | 4/1998 | Danstrom .................... 323/351 |
| 5,808,455 A | * | 9/1998 | Schwartz et al. ............ 323/271 |
| 5,945,817 A | | 8/1999 | Nguyen |
| 6,057,675 A | * | 5/2000 | Tateishi ....................... 323/283 |
| 6,249,111 B1 | | 6/2001 | Nguyen |
| 6,369,557 B1 | * | 4/2002 | Agiman ....................... 323/282 |
| RE37,708 E | * | 5/2002 | Danstrom .................... 323/351 |
| 6,396,252 B1 | * | 5/2002 | Culpepper et al. .......... 323/225 |
| 6,456,049 B2 | * | 9/2002 | Tsuji ........................... 323/282 |
| 6,541,947 B1 | * | 4/2003 | Dittmer et al. .............. 323/225 |
| 6,548,991 B1 | * | 4/2003 | Maksimovic et al. ....... 323/350 |

\* cited by examiner

Primary Examiner—Jeffrey Sterrett
(74) Attorney, Agent, or Firm—Blakely, Sokoloff, Taylor & Zafman LLP (57) ABSTRACT

Power is applied to a voltage supply. A signal that indicates reduced work capability in an integrated circuit (IC) that is being powered by the voltage supply is generated based on workload demand or conscious power and performance tradeoffs. This signal is applied to increase the power efficiency of the voltage supply, while the supply is powering the IC in its reduced work capability state.

29 Claims, 5 Drawing Sheets

POWER SAVINGS IN A VOLTAGE SUPPLY CONTROLLED ACCORDING TO A WORK CAPABILITY OPERATING MODE OF AN INTEGRATED CIRCUIT

BACKGROUND

An embodiment of the invention is related to achieving power savings in electronic systems, such as mobile computing and communication products (e.g. notebook computers), having integrated circuits.

Power savings is an important part of operating an electronic system, not just for achieving energy conservation in general but also for extending the run-time of a battery-powered mobile product such as a notebook or laptop computer.

A typical notebook personal computer includes the following components. A battery is used as the main power supply of the computer. The battery supplies power to all of the different components of the computer including, for example, the display, the mass storage device, and computing logic. The computing logic typically includes a processor die and a system chipset, both of which are examples of integrated circuits. The chipset allows the processor to communicate with I/O devices and with main memory in the computer. Modern integrated circuits use relatively low, DC supply voltages on the order of about 1 Volt, to achieve lower power consumption. Since the output voltage of the main power supply can be substantially greater than the input supply voltage of integrated circuits, e.g. 10 Volts or more, a step down switching regulator is often used to provide this relatively low, well regulated DC voltage to the integrated circuits at power levels of 20 Watts and more.

A popular power saving technique implemented in notebook computers is to use integrated circuits that can operate in a state or mode of reduced work capability that leads to reduced power consumption. For example, some processors, such as the PENTIUM IV brand of processors by Intel Corp. of Santa Clara, Calif., can operate according to an internal core clock signal that can be on/off modulated. This is an example of processor clock 'throttling' which temporarily puts the processor in a non-active mode, which in turn significantly reduces processor power consumption. A broader set of power states or work capability modes have been defined to place the processor in various 'sleep' states. In a sleep state, some or all of the computing and I/O functions of the processor are essentially shut down, by either stopping a clock signal to them or reducing their supply voltage to a minimum level. This reduction in work capability causes a significant reduction in the load current of the switching regulator that supplies power to the processor.

Another way of reducing power consumption is suggested in U.S. Pat. No. 5,945,817 to Nguyen, where a narrower, rather than broader, range is maintained for the processor input supply voltage. That patent describes a variable voltage supply that is coupled to receive a power status signal from a processor, where this signal indicates a power consumption mode in which the processor operates. The voltage supply provides the processor with a supply voltage that is a function of the power status signal and that can be maintained in the narrower range to reduce the power consumption of the processor when the processor is idle.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
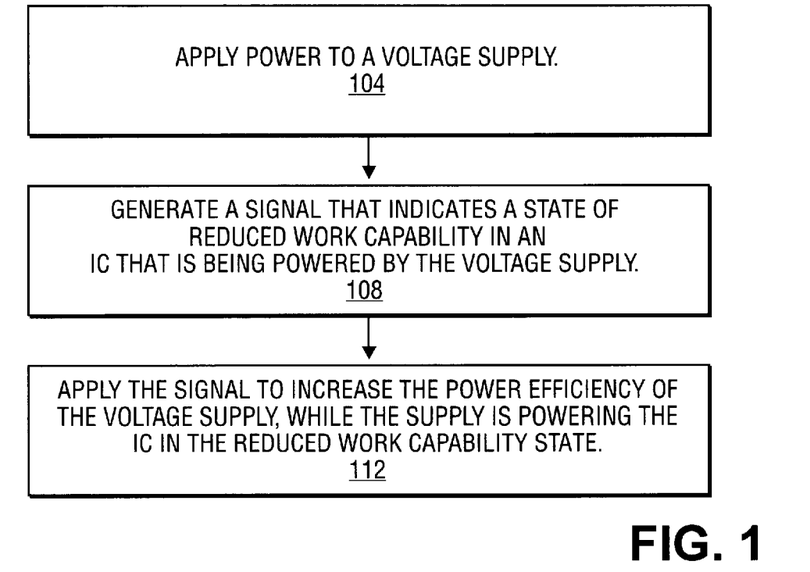
FIG. 1 shows a flow diagram of a method for obtaining power savings in a voltage supply controlled according to a work capability mode of an integrated circuit.

FIG. 1 shows a flow diagram of an embodiment of the invention. This flow diagram depicts a method that may achieve power savings in a voltage supply that is powering an integrated circuit (i.e. IC). The method begins with applying power to a voltage supply (block 104). Power may be applied to the voltage supply by connecting a DC voltage source, such as a battery, to the voltage supply. In that case, the voltage supply may include a step down DC to DC regulator, to yield a lower, regulated DC output voltage. Power may alternatively be applied by connecting to an AC power source, where in that case the voltage supply may include an AC to DC converter to yield the regulated DC voltage. In most cases, a switching power supply circuit would be used for the regulator or converter, as compared to a linear power supply circuit, due to the increased power efficiency of the switching regulator design.

After power has been applied, which puts the IC in operation, a signal that indicates the IC is in a reduced work capability mode is generated (block 108). This signal is then applied to increase the power efficiency of the voltage supply, while the supply is powering the IC in its reduced work capability mode (block 112). The signal may indicate the current state of the IC or a state into which the IC will soon transition. For example, the signal may be a digital signal that is asserted just before, at the same time, or just after the IC actually enters a lower work capability mode. The signal may be asserted in response to 'intelligence' in a system of which the IC is a part, where this intelligence may be, for example, a piece of code being executed for power management in the system. As such, the signal may represent a power management command being requested, to place the IC in its reduced work capability mode, which then may be expected to lead to reduced power consumption in the system. The signal may be generated by control logic circuitry in a processor die or in a system chip set, for example, where the processor die and also perhaps the chip set are part of the IC that is being powered by the voltage supply. Certain techniques that are aimed to increase the power efficiency of the voltage supply will be described below.

According to an embodiment of the invention, the application of the signal to increase the power efficiency of the voltage supply does not substantially change an input supply voltage of the IC. Although there may be some increase or decrease in the output of the voltage supply when the signal has been applied (in an attempt to increase power efficiency), this need not result in a significant change in the output voltage of the voltage supply.

Figure 2:
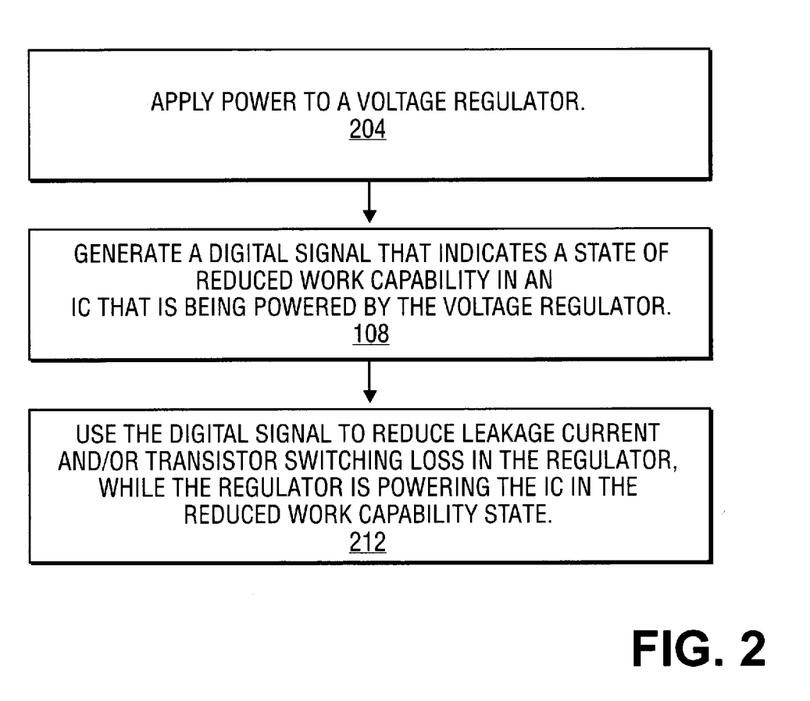
FIG. 2 illustrates a block diagram of another method for obtaining the power savings in the voltage supply.

FIG. 2 shows another embodiment of the invention. In this figure, a method is depicted in which power is applied to a switching voltage regulator (block 204). Thereafter, a digital signal that can take on multiple, discrete signal levels which indicate at least a state of reduced work capability in an IC that is being powered by the switching regulator, is then generated (block 208). This digital signal may support two or more stable states which may be defined to represent two or more corresponding states of work capability of the IC. For example, in one state the IC is capable of higher performance than in the other in which some or all of the functionality of the IC has been shut down. This state of reduced work capability is expected to result in significantly reduced power consumption by the IC while operating in that state. Multiple modes of progressively lower work capability may be defined, which may lead to correspondingly reducing levels of maximum power consumption. For example, in the case of the IC being a processor, the power-hungry functionality that may be shut down includes floating point or integer arithmetic units, upper level caches, and high speed I/O interfaces. Such power hungry functionality may be disabled, for example, when it is not needed (e.g., automatically according to workload demand, such as when the IC is idle due to no I/O requests being generated) or when a conscious (or intentional) performance and power tradeoff is being made at the system level. An example of the latter is when certain functionality in the IC is shut down, even though the functionality is needed to immediately execute a program in the system, because a battery that is powering the system is being depleted too quickly or because the IC die is too hot.

The digital signal is then used to reduce, for example, leakage current, transistor switching loss, or both, in the switching regulator, while the regulator is powering the IC in its lower work capability state (block 212). It may be expected that the reduction in leakage current and/or transistor switching loss in the regulator will help improve the power efficiency of the regulator, while the regulator is powering the IC which enters a lower work capability state.

Leakage current may be reduced by, for example, cutting off a current path using a transistor that has lower cutoff leakage current and that has been placed in series with the path. A reduction in transistor switching loss may be obtained by, for example, reducing the frequency of a power switching transistor, all the way down to zero if possible. Another technique for reducing switching losses in a transistor is to limit the voltages or currents that are applied to the control electrode of the transistor. According to an embodiment of the invention, these reductions are obtained without changing the input supply voltage to the IC, or essentially maintaining the output voltage of the voltage supply. Some possibilities for reducing the leakage current and reducing transistor switching loss in a switching regulator will be described further below in connection with FIGS. 4 and 5.

Of course, additional digital signals may be generated that indicate further states of reduced or increased work capability in the IC. These signals may indicate mutually exclusive states of operation. For instance, three different digital signals can be generated, where one indicates an active mode of operation when asserted, another indicates a sleep mode when asserted, and the third indicates a deep sleep mode. The change to the voltage supply, which results in an increase in its power efficiency, may be performed in response to any one of these signals being asserted, while the voltage supply is powering the IC in the respective state of operation indicated by the signal being asserted. An example of such a multi-signal embodiment of the invention will be described below in connection with FIGS. 4 and 5.

Figure 3:
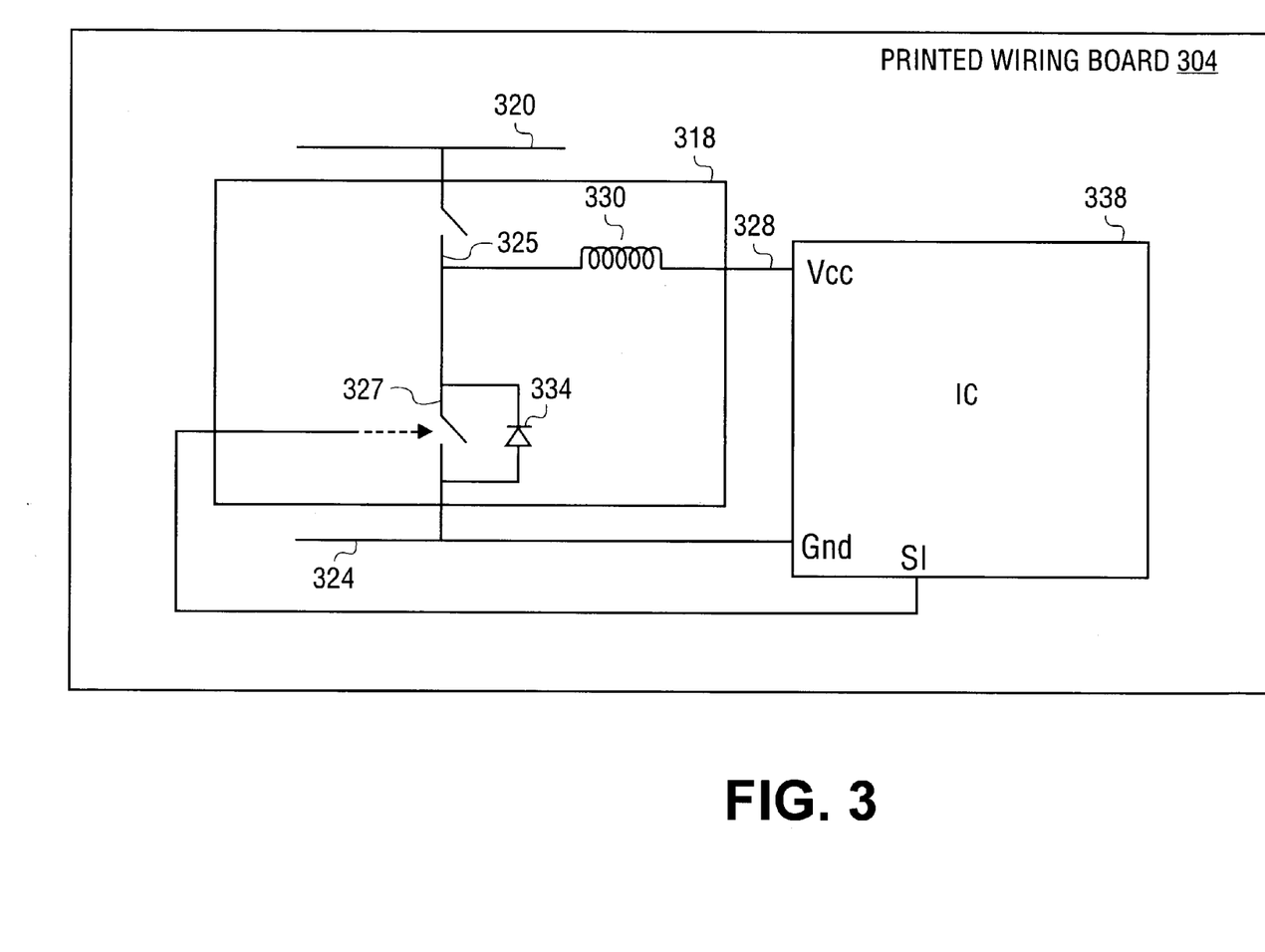
FIG. 3 depicts a block diagram of an apparatus having a switching voltage regulator coupled to power an integrated circuit and controlled in a manner that helps obtain power savings in the regulator.

Referring now to FIG. 3, what is shown there is a block diagram of another embodiment of the invention, where an apparatus having a switching voltage regulator 318 is coupled between a power supply node 320 and a power return node 324 and is coupled to power an IC 338. Both the IC 338 and the regulator 318 may be installed directly on the same printed wiring board 304 (pad footprints not shown), or directly on different boards (not shown) which are then connected by connectors (not shown). The regulator 318 is capable of repeatedly opening and closing a first low impedance path 325 between an output node 328 and the power supply node 320. In addition, a second low impedance path 327 can be repeatedly opened and closed between the output node 328 and the power return node 324. These features let the switching regulator operate in a 'synchronous' mode in which relatively high load currents can be provided. An inductor 330 is coupled between the output node 328 and the two paths 325,327. A diode 334 allows a one-directional current path between the return node 324 and the inductor 330 when the second low impedance path 327 has been closed. Together with additional control circuitry not shown, this design of a step down switching regulator permits a voltage of the output node 328 to be fixed at some predetermined level, despite variations in parameters such as the voltage at the supply node 320, the load current, as well as environmental factors such as operating temperature.

The switching regulator 318 is designed for a load current and a nominal output DC voltage that is in the range acceptable for operating the IC 338. The IC 338 may be composed of several IC dies that are communicatively connected to each other, such as a processor and a system chipset. In this embodiment of the invention, it is the IC 338 which generates, at a status indicator (i.e., SI) output, a SI signal that indicates a state of work capability of the IC 338. The SI signal is provided to the switching regulator 318. A solid state circuit for closing the second path 327, but not the first path 325, is provided in the switching regulator 318, under control of the SI signal. The control of the closure of the second low impedance path 327 will be such that, for example, transistor switching loss and/or leakage current through the path is reduced. The switching regulator may be referred to as operating in a 'non-synchronous' mode while the second path 327 is kept closed. Meanwhile, the first path 325 continues to be opened and closed during the time the SI signal is asserted, to maintain the output voltage at node 328 at substantially the same level. Alternatively, a small change in the output voltage may also be commanded in response to the SI signal being asserted. See, for example, U.S. Pat. No. 5,945,817 to Nguyen. If possible, such a change in the output voltage should be achieved while continuing to keep the second path 327 closed during the time the SI signal is asserted.

The SI signal may originate from logic circuitry in either the processor die or the system chipset, for example in response to a power management command being executed in the system to place the processor in a reduced or increased work capability mode. Additional signals may be generated by the logic circuitry that indicate further states of operation of the IC 338, where the closing of the second path 327 is placed further under control of these additional SI signals. According to an embodiment of the invention, one SI signal indicates whether the processor is or is not in an active mode of operation (higher work capability), while the other signal indicates whether the processor is or is not in a sleep mode (lower work capability). Yet a further SI signal that is used for throttling a clock of the processor may be provided, for further controlling the closure of the second low impedance path 327.

Figure 4:
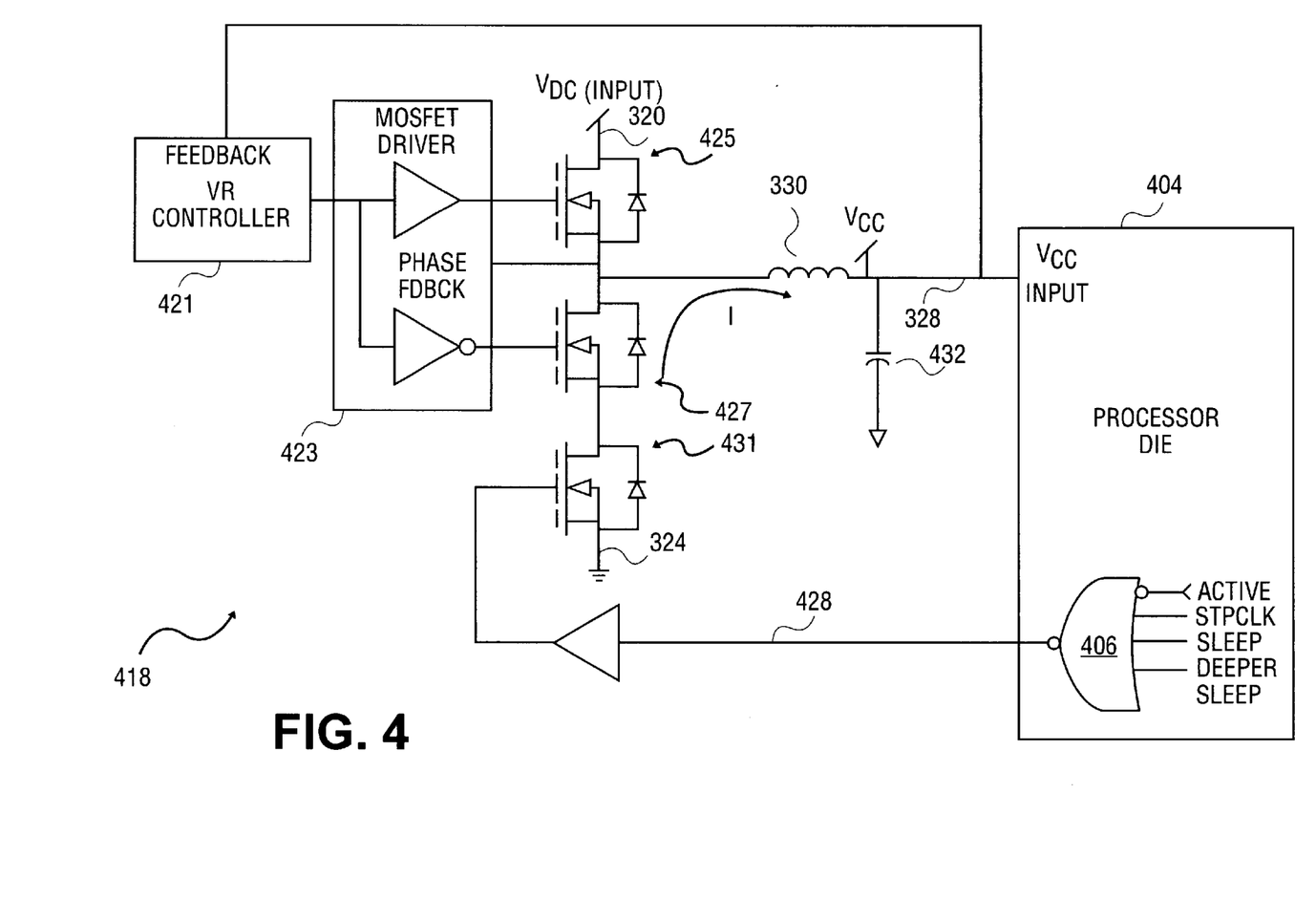
FIG. 4 shows a block diagram of a system including an integrated circuit that is designed to achieve power savings in voltage regulation.

Turning now to FIG. 4, another embodiment of the invention is illustrated, wherein in this case a switching 'buck' regulator 418 is coupled between the power supply node 320 and power return node 324. The regulator 418 has a driver 423 which in this embodiment of the invention is designed to drive the gate electrodes of metal oxide semi-conductor field effect transistors (i.e., MOSFETS). The driver 423 is coupled to drive first and second switching power devices 425,427 which, again in this embodiment of the invention, are each single, n-channel power field effect transistors. Each of these devices can provide its respective low impedance path between the output nodes 328 and their respective power supply or power return nodes. An inductor 330 used to store energy in the regulator is fed a load current by the first device 425 or by the second device 427. A low pass filtering shunt capacitor 432 is also provided to help further reduce the ripple in the DC voltage at the output node 328. Two points of feedback are also provided in this regulator, one from the output node 328 back to a voltage regulator controller 421, and one from the common node between the devices 425 and 427, also referred to as the phase feedback node. This feedback information is used by the controller 421 to signal the driver 423 so as to repeatedly open and close the low impedance paths through the devices 425 and 427 according to conventional switching power supply techniques, so that the DC voltage at the output node 328 is maintained at a predetermined level that is below the voltage of the power supply node 320.

The output node 328 is coupled to the supply voltage input of a processor die 404 which is an example of an IC. A status indicator (i.e., SI) signal which indicates a state of work capability of the processor die 404 is generated, in this embodiment of the invention, in the processor die 404. Several such signals may be generated. In the embodiment of the invention illustrated in FIG. 4, there are four such signals labeled ACTIVE, STPCLK, SLEEP, and DEEPER SLEEP. These digital signals are fed to the inputs of a NOR gate 406. The output of the NOR gate 406 is buffered and then fed to the control electrode of a third switching power device 431 which, in this embodiment of the invention, is another single, n-channel power FET. This third device 431 is connected in series with the second device 427, to allow closure of a low impedance path there through, under control of the output of the NOR gate 406. Operation of the system in FIG. 4 will now be described using the following example.

With DC power being applied to the supply node 320, the controller 421 causes the voltage at the output node 328 to rise to its predetermined level, by the action of turning on (e.g. channel inversion) and off (e.g. channel cutoff) the devices 425 and 427 such that the desired load current is provided through the inductor 330. In addition, assuming the processor die 404 is in its active mode, such that the active signal is asserted (high), and all of the other indicator signals STPCLK, SLEEP, and DEEPER SLEEP are deasserted (low), the output of the NOR gate 406 rises to a high level sufficient to invert the channel of device 431 and thereby create a low impedance path through that device. During operation in the active mode, the regulator 418 is in its synchronous mode of operation; the device 431 remains in its low impedance state and provides a return path, through its inverted channel, for the inductor current from the return node 324.

Next, when the processor die 404 leaves the active mode, where this occurs if any of the STPCLK, SLEEP, and DEEPER SLEEP signals are asserted, the output of the NOR gate 406 drops to a low level sufficient to place the device 431 in cutoff. This, of course, closes the low impedance path through the channel of the device 431, but still allows a one-directional current flow from the return node 324 through the body or substrate diode of the device 431. Note that the regulator 418 is now in its non-synchronous mode of operation. Meanwhile, the first and second devices 425 and 427 continue to be controlled by the controller 421, via the driver 423. The improvement in efficiency may now be explained as follows.

It may be recognized that power is undesirably being dissipated through the device 427, even during the time that the processor die 404 is in its reduced work capability state (as indicated by the assertion of STPCLK, SLEEP, and DEEPER SLEEP), where in this state the load current to the regulator 418 has been significantly reduced. That is because the controller 421 may continue to switch the device 427 at a high frequency (e.g. 300 kHz or higher), such that the device 427 continues to toggle at this rate even while the processor is in the reduced work capability state. Measurements have shown that in a state such as sleep or deeper sleep, power dissipated through the switching device 427 may be as high as 800 mW. This constant switching at 300 kHz and higher causes, it is believed, large switching power dissipation in the gate and output capacitance of both devices 425 and 427. As these devices 425 and 427 continue to be rapidly switched, the load current through the inductor 330 continues to flow but at a significantly reduced level than when the processor die is in the active mode. To increase the efficiency of the power supply by reducing the power dissipated in such continuous high frequency switching, the embodiment of the invention in FIG. 4 allows the low impedance path to the return node 324 through the device 427 to be closed, by cutting off the device 431. When that happens, the inductor current from the return node 324 leaks through the reverse biased body diode that is in the substrate of the device 431. It is believed that this results in much smaller power dissipation, in the gate capacitance of the devices 425 and 427 because the input voltage to the processor die 404 does not drop significantly (at a high rate) to signal the VR controller 421 to frequently charge the output node 328. When the inductor current has dropped to a sufficiently low level, the body diode of the device 431 stays reverse biased, thereby substantially reducing or even eliminating the repeated discharge and recharge of the output voltage at node 328. This assumes that the load current during the reduced work capability mode of the processor die 404 drops to a low enough level.

The above sequence yields a decay rate for the voltage at the output node 328 that is much slower than when the device 431 is turned on. As a result, the switching frequency (controlled by the controller 421) can be reduced while the processor die 404 is operating in a reduced work capability mode, for instance all the way down to 1 kHz, at a significantly reduced load current but at the same DC output voltage that was being provided to the processor die 404 during the increased work capability state (e.g. while the ACTIVE signal was asserted). This in turn causes a significant reduction in power loss associated with switching a transistor, thereby further helping improve the efficiency of the regulator 418.

All of the switching power devices should be adequately sized so that each can tolerate the currents that are generated while the IC is operating in its normal or active mode. In addition, the routing of the conductive lines which carry the SI control signal between the IC and their voltage supply, where in the embodiment of the invention in FIG. 4 there is only one such conductive line 428, should be designed so that the control signal can reach the control electrode of the third switching power device relatively quickly and without taking too much area in the printed wiring board on which the voltage supply and IC are installed. A further feature that is possible is to design the third switching power device to have a lower cutoff leakage current than the others. Finally, it should be noted that although in the embodiment of the invention of FIG. 4 the SI signals labeled ACTIVE, STPCLK, SLEEP, and DEEPER SLEEP originate in the processor die 404, one or more of these may originate off die, for instance from a chip set (not shown).

Figure 5:
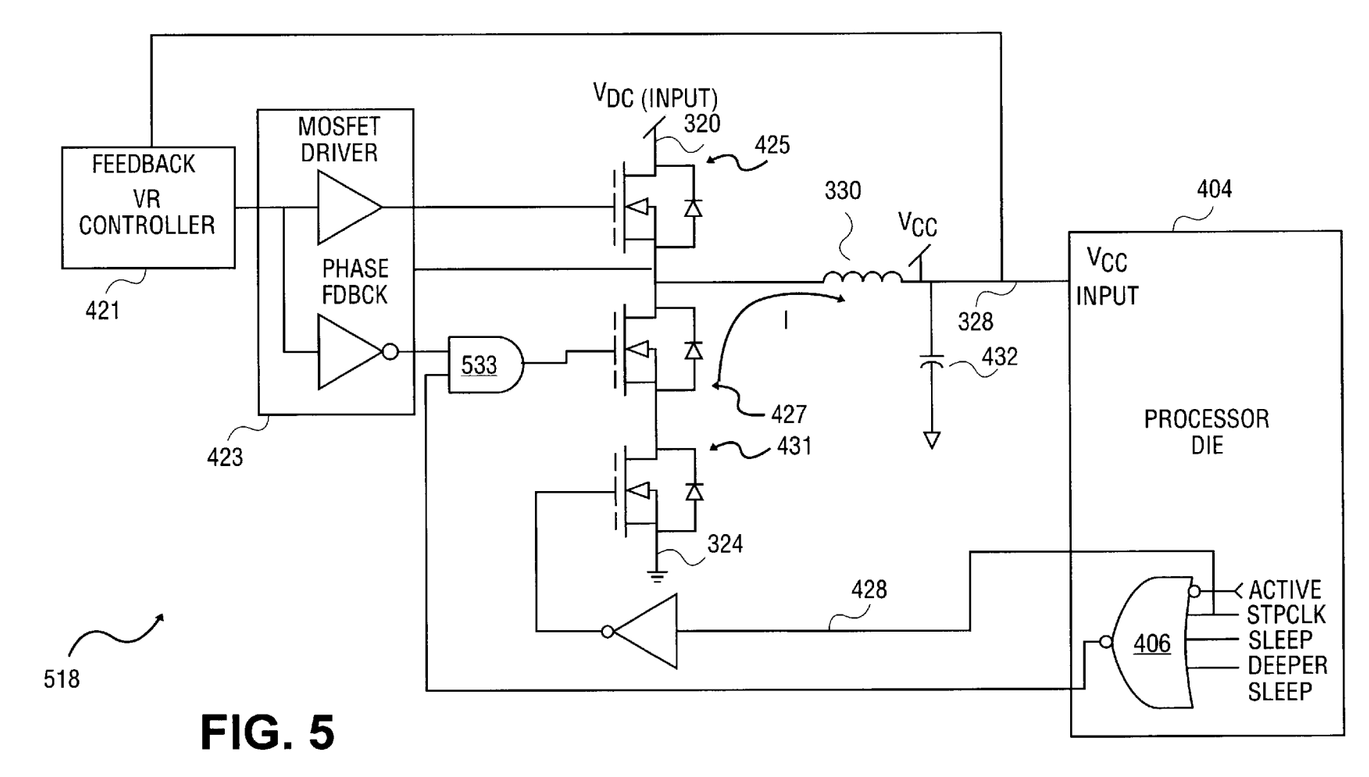
FIG. 5 illustrates a block diagram of another system that includes an integrated circuit that is designed to achieve power savings in voltage regulation.

Referring now to FIG. 5, another embodiment of the invention is illustrated which includes a switching regulator 518 that is powering a processor die 504. Differences between the regulator 518 and the regulator 418 of FIG. 4 include the use of a gate circuit coupled between an output of the driver stage 423 and a control electrode of the second switching power device 427. This gate circuit is under the control of a SI signal that indicates a work capability state of operation of the processor die 504. The PSI signal is passed through the NOR gate 406 to, in this embodiment of the invention, an input of a two input AND gate 533. This configuration in essence qualifies the output signal from the driver stage 423 with a SI signal. When the processor die 504 is in the active mode (e.g. higher performance capability and therefore higher power consumption), and the STPCLK, SLEEP, and DEEPER SLEEP signals are deasserted, the output of the NOR gate 406 rises to a high level, such that the control signal at the output of the driver stage 423 is forwarded through the AND gate 533, to the control electrode of the device 427. This may be the normal mode of operation of the switching regulator. In addition, with STPCLK being deasserted, the channel of the device 431 is inverted such that a low impedance path between the return node 324 and the output node 328 is controlled entirely by the output of the driver 423 that feeds the gate of device 427. If the processor die 404 should leave the active mode (and enter lower performance capability and therefore lower power consumption), such as by the assertion of any one of the STPCLK, SLEEP, and DEEPER SLEEP signals, then the AND gate 533 drives the control electrode of the device 427 to a low level, thereby cutting off the device 427. The low impedance path having been closed in this manner, the current to the inductor 330 must then pass through the reverse biased body diode of the device 427.

In another mode of operation, if the processor die 504 leaves the active mode by virtue of the STPCLK signal being asserted, rather than the SLEEP or DEEPER SLEEP signals, not only is device 427 placed into cutoff, but so is device 431. The device 431 will be placed in cutoff sooner than the device 427, due to the shorter delay between the SI signal being generated and its effect on the control electrode of the device 431. This configuration allows for a fast response to the STPCLK signal, by rapidly closing the low impedance path to the return node 324, while at the same time taking advantage of the lower leakage current characteristics of the device 431 when its body diode stays reverse biased.

In the embodiments of the invention shown in FIGS. 4 and 5, the modifications to the system do not involve making any changes to the controller 421, driver 423 or switching power devices 425 and 427. Rather, all of the changes, including the addition of the third switching power device 431 and/or the AND gate 533 (and associated routing of conductive lines for forwarding the SI signals) can be performed on the printed wiring board, by the manufacturer of the board. Also, the NOR gate 406 need not be provided on the processor die 404, 504, and can alternatively be provided separately on the printed wiring board.

Figure 6:
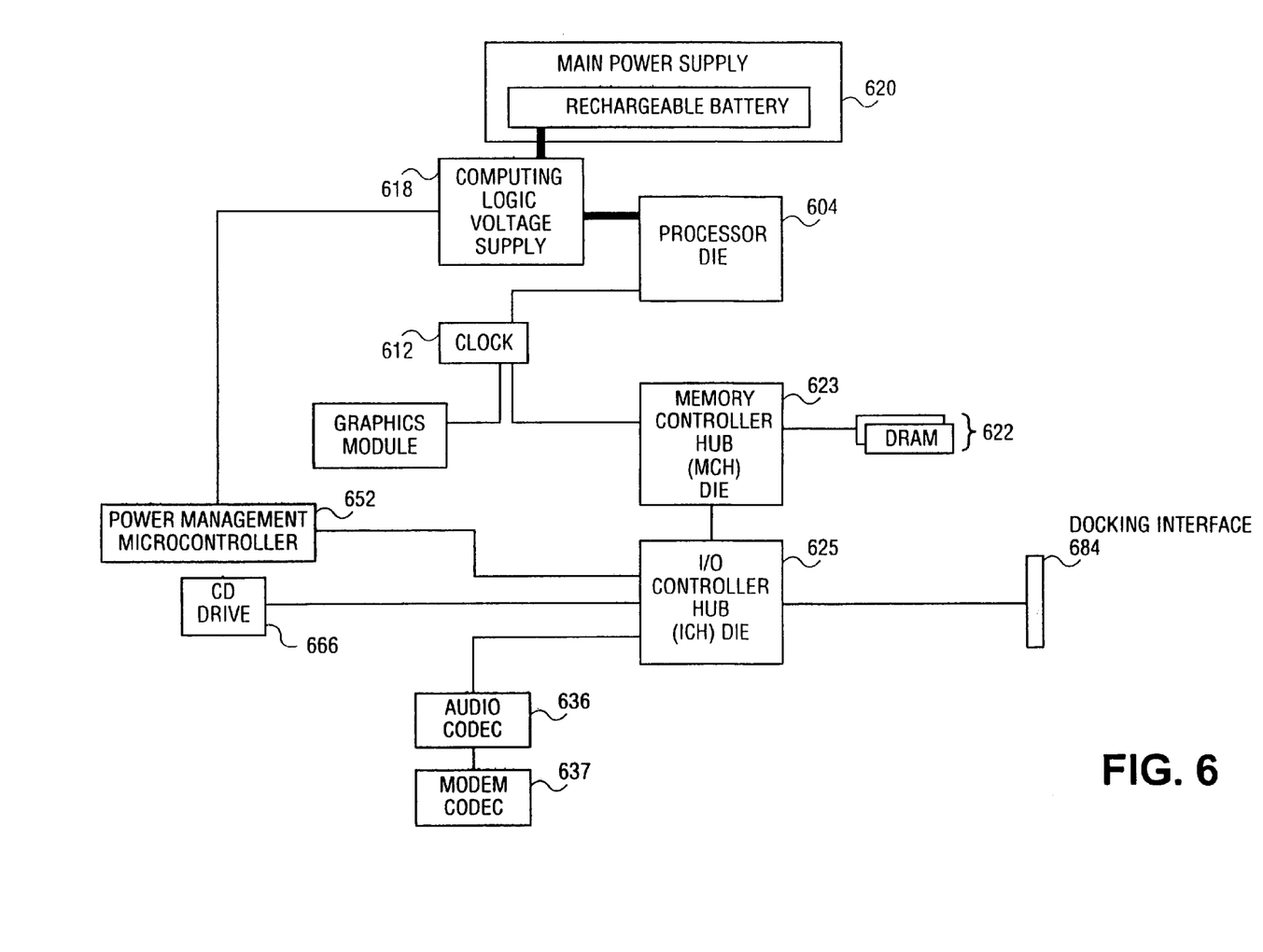
FIG. 6 depicts a block diagram of a computer system.

Referring now to FIG. 6, a block diagram of a computer system is shown, as yet another embodiment of the invention. The computer system has a main power supply 620, which, as mentioned above, may include a rechargeable battery and/or an AC to DC power converter. The main power supply 620 supplies the power required by the computing logic voltage supply 618 as well as the power required by other components of the system including for example a compact disc (CD) drive 666, a display screen (not shown), and docking interface 684. The voltage supply 618 in turn provides a regulated, DC output voltage that will be used by the IC components of the system which include, in this embodiment of the invention, a processor die 604, a memory controller hub (i.e., MCH) 623, and an I/O controller hub (i.e. ICH) 625. The latter two dies are part of the system chip set.

The MCH 623 and ICH 625 are part of the system core logic that also includes main memory 622 composed of dynamic random access memory (i.e. DRAM) and graphics module 654, all of which may be conventional components. A peripheral components interconnect (i.e. PCI) bus 656 includes a docking interface 684 as an agent. Such a docking interface is one commonly found in conventional, mobile products such as notebook/laptop computers, where the docking interface 684 allows the mobile product to communicate with a docking station or a desktop computer (not shown). In addition, the ICH 625 also has audio codec capability 636, such as a popular, high quality, 16-bit audio architecture for the personal computer that is used in many modem desktop systems. In addition, a modem codec 637 may also be provided to support a telephone line modem connection. Finally, the ICH 625 also has a direct interface to a mass storage device such as a compact disc (i.e., CD) drive 666, which may be in addition to the support for a hard disc drive (not shown). It will be appreciated by those of ordinary skill in the art that a wide range of different logic functions may be included in the system chipset of a computer system, including an arrangement different than the one shown in FIG. 6. In the embodiment of the invention in FIG. 6, the SI signals generated by the processor die 604 (or by the chipset) will be routed to a power management controller 652, prior to being forwarded to the voltage supply 618. This is in contrast to the direct connection in FIGS. 4 and 5. The power management controller 652 monitors and manages power consumption in the entire system, so it may be convenient to allow this controller 652 to also control the power efficiency of the voltage supply 618 as otherwise described above.

To summarize, several techniques that may achieve power savings in a voltage supply, as controlled according to a work capability operating mode of an integrated circuit, have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, the block diagram illustrated in FIG. 6 describes a system that may be a part of a notebook computer (as was described above), or it may alternatively be a part of a desktop computer or other electronic system in which power savings is a concern. The specification and drawings are, accordingly, to be regarded in an illustrative rather than a restrictive sense.

What is claimed is:

1. An apparatus comprising:
   a switching voltage regulator coupled between a power supply node and power return node, capable of repeatedly opening and closing (1) a first low impedance path between an output node and the power supply node and (2) a second low impedance path between the output node and the power return node, to regulate a voltage of the output node;
   an integrated circuit (IC) having a supply voltage input coupled to the output node; and
   means for closing the second path but not the first path under control of a first signal that indicates a work capability mode of the integrated circuit.

2. The apparatus of claim 1 wherein the IC includes a processor die having said supply voltage input.

3. The apparatus of claim 2 wherein the IC further includes a system chipset communicatively coupled to the processor die.

4. The apparatus of claim 2 wherein the first signal originates from the processor die.

5. The apparatus of claim 3 wherein the first signal originates from the system chipset.

6. The apparatus of claim 5 wherein the means for closing is further under control of a second signal that indicates a work capability mode of the IC.

7. The apparatus of claim 6 wherein the second signal originates from the processor die.

8. The apparatus of claim 7 wherein the first signal is a digital signal that, when asserted, indicates that the processor die is in an active mode, and the second signal is a digital signal that, when asserted, indicates that the processor die is in a sleep mode.

9. The apparatus of claim 8 wherein the means for closing is further under control of a third signal that is used for throttling a processor clock.

10. A method comprising:
    applying power to a switching voltage regulator;
    generating a first digital signal that indicates a state of reduced work capability in an integrated circuit (IC) that is being powered by the switching regulator; and
    using the first signal to reduce leakage current in the regulator while the regulator is powering the IC in the reduced work capability state, wherein the leakage current is reduced by cutting off a low impedance path through a power switching device of the regulator, while the first signal remains asserted, using a lower leakage power switching device in series with the path.

11. The method of claim 10 wherein the leakage current is reduced, without changing a regulated output voltage of the switching regulator.

12. The method of claim 10 further comprising:
    generating a second digital signal that indicates a further state of reduced work capability in the IC; and
    generating a third digital signal that indicates a further state of reduced work capability in the IC;
    wherein said reduction in leakage current is performed in response to any one of the first, second and third signals being asserted, while the regulator is powering the IC in the respective state.

13. The method of claim 10 wherein the reduced work capability state is a sleep state, and the first digital signal is generated in response to the IC entering the sleep state following a power management routine being executed to reduce power consumption in a system of which the IC is a part.

14. A system comprising:
    a printed wiring board having signal and power lines;
    a step down switching voltage regulator installed on the board, coupled to the signal and power lines, and coupled between a power supply node and a power return node, the regulator having a driver stage coupled to drive (1) a first switching power device that can provide a first low impedance path between an output node and the power supply node and (2) a second switching power device that can provide a second low impedance path between the output node and the power return node;
    an integrated circuit (IC) installed on the board, coupled to the signal and power lines, and having a supply voltage input coupled to the output node, wherein the voltage regulator further includes a gate circuit coupled between an output of the driver stage and a control electrode of the second switching power device, the gate circuit being under the control of a first digital signal that, when asserted, indicates the IC is operating in a reduced work capability mode; and
    a main power supply that is coupled to supply power to the regulator via the power supply and return nodes.

15. The system of claim 14 wherein the gate circuit includes an AND gate having a first input coupled to the output of the driver stage, a second input coupled to receive the first signal, and an output coupled to the control electrode.

16. The system of claim 14 wherein the voltage regulator further includes a third switching power device coupled in the second path to close the second path under control of the first signal.

17. The system of claim 16 wherein the first signal is to be used for throttling a processor clock.

18. The system of claim 14 wherein the gate circuit is under further control of a second digital signal that, when asserted, indicates that the IC is operating in a different work capability state than the one indicated by the first signal.

19. The system of claim 18 wherein the IC includes a processor die, and the states of work capability are different degrees of sleep for the processor die.

20. A system comprising:
    a switching voltage regulator having synchronous and non-synchronous operation capabilities; and
    an integrated circuit (IC) to receive a supply voltage from the regulator, and to provide a signal that indicates a reduced work capability state of the IC and selects said non-synchronous operation in the regulator when the regulator is to power the IC in the reduced work capability state.

21. An apparatus comprising:
    a switching voltage regulator coupled between a power supply node and a power return node, the regulator having a driver stage coupled to drive (1) a first switching power device that can provide a first low impedance path between an output node and the power supply node and (2) a second switching power device that can provide a second low impedance path between the output node and the power return node, and an integrated circuit (IC) having a supply voltage input coupled to the output node, wherein the voltage regulator further includes a third switching power device coupled in the second path to close the second path under control of a first signal that indicates work capability of the IC.

22. The apparatus of claim 21 further comprising a printed wiring board having signal and power lines that connect the regulator and the IC which have been installed on the board.

23. The apparatus of claim 22 wherein the IC includes a processor die and a system chipset communicatively coupled to each other via the board, and wherein the first signal is a digital signal that originates from one of the processor die and chipset.

24. The apparatus of claim 23 further comprising a main power supply that is coupled to supply power to the regulator via the power supply and return nodes.

25. The apparatus of claim 24 wherein the main power supply includes a rechargeable battery.

26. The apparatus of claim 21 wherein the third power switching device has a lower cutoff leakage current than the second power switching device.

27. The apparatus of claim 26 wherein the first, second, and third power switching devices are power field effect transistors.

28. A method comprising:

applying power to a switching voltage regulator;

generating a first digital signal that indicates a state of reduced work capability in an integrated circuit (IC) that is being powered by the switching regulator; and using the first signal to reduce transistor switching loss in the regulator while the regulator is powering the IC in the reduced work capability state, wherein the transistor switching loss is reduced by preventing a power switching device of the regulator from being switched while the first signal remains asserted.

29. The method of claim 28 wherein the reduced work capability state is a sleep state, and the first digital signal is generated in response to the IC entering the sleep state following a power management routine being executed to reduce power consumption in a system of which the IC is a part.

* * * * *